United States Patent Office 3,450,753
Patented June 17, 1969

3,450,753
PROCESS FOR REACTING AMMONIA-UREA-POLY-AMINO POLYCARBOXYLIC ACID TO FORM A CHELATING AGENT
Frederick C. Bersworth, East Orange, N.J., assignor to Weston Chemical Corporation, Morristown, N.J., a corporation of New Jersey
No Drawing. Filed Oct. 2, 1967, Ser. No. 672,022
Int. Cl. C07c *101/00;* C05c *9/00*
U.S. Cl. 260—534     8 Claims

ABSTRACT OF THE DISCLOSURE

A process comprising reacting ammonia and urea essentially on a one to one molar basis to produce a condensation product which is further reacted with a polyamino polycarboxylic acid complexing agent to form a composition useful generally as a chelating agent and, more particularly, as a chelating agent suitable for addition to soil as a metal carrier or as a metal solubilizing agent.

---

This invention is concerned with a novel composition of matter formed by the reaction of urea in the presence of ammonia to form a condensation product which has chelating properties and which can further be reacted with a known chelating agent of the synthetic polyamino polycarboxylic acid type to obtain an additional chelating function.

BACKGROUND OF THE INVENTION

Ammonia, urea, and the synthetic polyamino polycarboxylic acid chelating agents individually are, of course, all well known compounds and have found a variety of uses as such. It is common knowledge also that ammonia and urea, as such, have wide application as fertilizing agents either by direct application or by incorporation with other carrier materials. Similarly, the synthetic carboxylic acid chelating agents are known as additives for soil and as improving agents for fertilizing compositions to help carry trace metal.

However, soil conditions generally are so variable that the complexing agent or the agent which can be useful in a wide range of soils has not hitherto been available. By wide range of soils I means soils having a pH ranging from low in the acid range to high into the alkaline range, as well as soils which may be deficient in or rich in metal for plant nutrition. In other words, the soil conditions are as variable as the environments in which the soils are found and, when this is coupled with the extreme variation in plant requirements, it is understandable that the number of specialized compositions should vary.

DETAILED DESCRIPTION OF THE INVENTION

The invention accordingly is in a chelating composition suitable for use in soil for the purpose of chelating metals and also as a source of nitrogen, the composition being characterized by its being a condensation reaction product of urea which may or may not be modified by the addition thereto of a chelating agent with or without a chelated metal. The proportions in which the ammonia is employed may range from one mole per mole of urea to a substantial excess in the order of 5 moles of urea per mole of ammonia or to an excess of 5 moles of ammonia per mole of urea. Generally, it will be the latter proportion which prevails. That is, the excess of ammonia over that of urea largely is the result of the fact that since urea is solid and ammonia gaseous, it is generally easier to react the compounds by reacting molten urea with the gaseous or aqueous ammonia.

The method of preparation is one in which ammonia is contacted with urea in either of two variants of the method constituting:

(1) Pouring concentrated aqueous ammonia onto solid urea in amount sufficient to bring the urea into solution, holding the mixture under pressure to keep the ammonia in solution, and heating to a temperature of the order of 140–150° C. to induce complete condensation and reaction and, thereafter, releasing pressure and evaporating to dryness to recover the condensate or condensation product.

(2) Melting urea in a reaction vessel and contacting it with anhydrous ammonia, that is, bubbling ammonia gas directly into the melt and maintaining the melt under some pressure so as to maintain good contact between the urea and the ammonia and, after having accomplished the passage of a reasonable quantity of the ammonia into the urea to obtain reaction, cooling and recovering the condensation product.

The product obtained either in the anhydrous operation or in the aqueous operation is one which is probably the result of a reaction which proceeds according to a mechanism as follows:

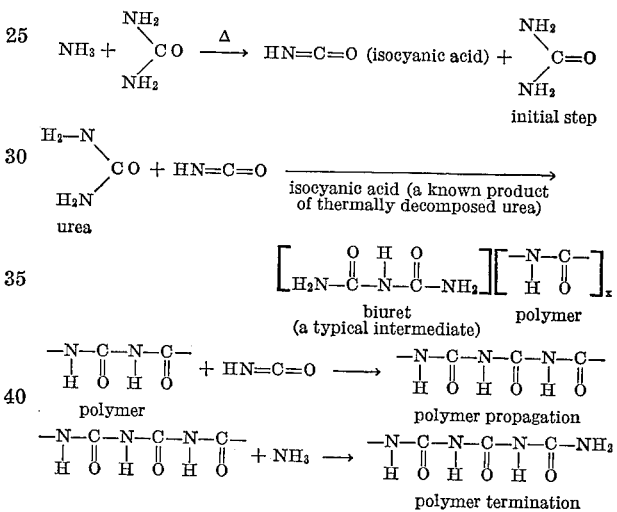

For a better understanding of the method of preparation and the nature and properties of the product, reference may be had to the following specific examples:

Example I

Five parts by weight of urea were condensed in the presence of 80 parts by weight of concentrated ammonium hydroxide (40%) by enclosing the mixture in a closed vessel and heating to a temperature of about 120° C. After allowing time for reaction, about 1 hour, surplus ammonia and water were evaporated to leave behind a white compound. The white compound obtained as the condensation product was solid, crystalline, and soluble in water. It reacts in a 1:1 molar ratio with ferric ion to form a stable complex at pH 5 through 7 and also forms a red complex with cupric ion stable to pH values greater than 11.

Theoretically, the compound formed in this condensation is probably closely related structurally to biuret. Biuret would be the terminal condensation product of urea. In this instance, the condensation occurs in the presence of ammonia, and, accordingly, I formulate it as an ammonia modified condensation product probably of the following structure:

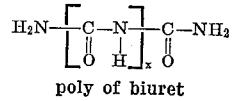

poly of biuret

Infrared studies indicate the structure is a reasonable probability in that peaks in the curve occur at the proper frequencies to indicate the presence of amide groups. Since the infrared spectra are quite similar to urea itself the polymeric imide structure does have to be considered.

Example II

The anhydrous preparation is a preferred method in that it relieves the operation of the problem of removal of large amounts of water. Urea is melted in a vessel, preferably a fairly deep vessel, or rather, one that is significantly deeper than it is wide, so that ammonia gas, when bubbled in will have a relatively long period for contact with the molten urea. Provision is made to introduce gaseous ammonia in a stream of fine bubbles into the bottom of the vessel and to allow it to percolate naturally up through the molten urea. The temperature of the urea is held at just above its melting level so as to create a liquid phase through which the gaseous ammonia is bubbled. A condensation reaction occurs and gaseous products of reaction are separated and expelled from the hot molten urea. Since urea in pure form melts at a temperature 132.7° C. the temperature of reaction is very easily held at a level close to this temperature merely by keeping it in the molten state.

If urea is heated too far beyond its melting temperature it decomposes. Actually, heating the molten urea to a temperature approaching 150°–160° is appropriate to induce faster reaction and better condensation. However, the melting temperature alone is quite adequate.

When measurement of the input of ammonia and the output of gases indicates that substantially all of the reaction has occurred the flow of ammonia is terminated and the molten mixture poured out onto drying trays or crystallizing trays for recovery. Simple cooling of the mix results in the production of a good grade of crystalline product.

The crystalline product which is white is soluble in water and will react on a direct one to one molar basis with ferric iron to form a complex. It similarly serves to complex cupric ion.

Take the polymer when $x=2$

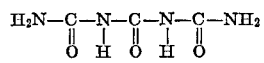

its enol form would be

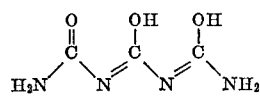

with a metal ion such as Fe (III)

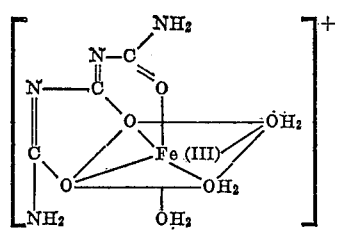

(A number of structures could be drawn depending upon the polymer chain length)

One of the unusual properties of the condensation product is its metal complexing capacity which shows when it is added to soil in that the presence of the complex in the soil actually solubilizes trace metals, including iron, which are present in the soil. In the process of decomposition of the metal complex, the condensation product yields ammonia and urea, both compounds useful sources of nitrogen for plants. Accordingly, the iron complex, which is a new compound, if performed and added to fertilizer compositions or added directly to soil is a very useful material for providing iron for plants in a medium which also serves as a source of plant nitrogen for the growth of the plant.

The urea-ammonia condensation product is a material which is basic and in accordance with the formula postulated it is probably a ureide polymer terminated with ammonia or amino groups. It thus presents the possibility of being further reacted with a chelating agent such as nitrilotriacetic acid, ethylenediaminetetraacetic acid, diethylenetriaminepentaacetic acid, and further polymers of the ethylene diamine acetic acid function, i.e., diethylenetriaminepentaacetic acid, as well as reaction with hydroxy ethyl variants of these compounds, such as hydroxyethylnitrilodiacetic acid, hydroxyethylethylenediaminetriacetic acid, and hydroxyethyldiethylenetriaminetetraacetic acid. In summary, in accordance with the formula:

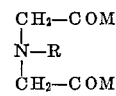

wherein,

R is hydrogen or

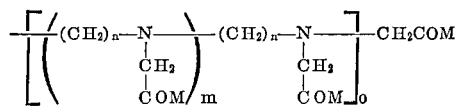

$m=0-4,$
$o=0, 1,$
$n=2, 3,$ and

—COM is independently selected from the group consisting of COOH, —COONa, —COOK, —COONH$_4$, CH$_2$OH, C—O—O-alkyl, not more than two COM's being —CH$_2$OH.

In other words wherever the polyacetic acid is formed, replacement of one or two of the acetic acid groups with the hydroxyethyl function is reasonable and the presence of the hydroxy ethyl group adds a labile hydrogen to the overall ligand structure, i.e. the urea-ammonia-polyacetic acid reaction product which is capable of surrounding a central metal atom and thereby forming a complex therewith, to enhance the chelating function of a fundamental acid itself.

Taking an acid of this family and reacting it with the urea-ammonia condensation product there are obtained extensions of the reaction product wherein the modified ethylenediaminetetraacetic chelating function is available with a long-chain polymer and 1, 2, 3 or 4 or more acetic acid modified by the ureide polymer, thus:

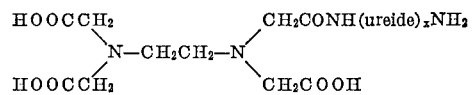

Example III

The condensate of ethylenediamine tetraacetic acid-urea-ammonia was prepared by condensing in molten form 5 grams of ethylenediaminetetraacetic acid 0.67 gram of urea and 40 milliliters of 15 molar ammonium hydroxide at a temperature of 130 to 140° in a vacuum (about 26 millimeters). This corresponds to the approximate range for the preparation of the urea ammonia condensate in accordance with the examples herein.

The condensate thus formed is titrated with standard base and with a 5:1 ratio of the condensate to

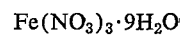

This is the 1:1 system on the titration curve.

The curve is similar to a curve obtained by titrating ethylenediaminetetraacetic acid with ferric ion in a 1:1 titration. However, a very interesting feature of this curve is that the precipitation indicating the complete exhaustion of the chelating agent capacity to complex iron does not occur until the pH reaches approximately 11.5. The complex also displays unusual heat stability. At pH in excess of 10.5, the solution can be boiled without precipitate formation.

Examples IV, V, VI, VII

The following summarizes some additional preparations:

Polynuclear carboxymethylamino acids+urea

| Examples | Reagents | Condition of reaction | Products and comments |
|---|---|---|---|
| X | EDTA, 50 grams; urea, 3 grams; NH$_4$OH excess 28%. | Heat, agitate and apply vacuum; final temp. 85 to 100° C. | 54 grams filter dry product dries in air to solid. |
| XI | EDTA, 60 grams; urea, 8 grams; NH$_4$OH 28% excess. | do | 75 grams filter dry product dries in air to white solid. |
| XII | EDTA, 60 grams; urea, 10 grams; NH$_4$OH 28% excess. | do | Net resinous product weight 79 grams, dries in air to 76 grams solid. |
| XIII | HEDTA, 60 grams; urea, 10 grams; NH$_4$OH 28% excess. | do | 78 grams very soft resin, will solidify in time to white soft solid. |
| XIV | DETPA, 70 grams; urea, 15 grams; NH$_4$OH 28% excess. | do | 96 grams resinous product will set to soft solid in air. |

HEDTA=hydroxyethylethylenediaminetriacetic acid; DETPA=diethylenetriaminepentaacetic acid.

Following the procedure of Example III the following chelating acids were used in preparing urea-ammonia condensate products using the properties and conditions of Example III.

The chelation properties are summarized as follows:

AMINO ACIDS AND UREA

| Examples | Product | pH 5 | pH 6 | pH 8-10+ | Comments |
|---|---|---|---|---|---|
| X | 3 grams of product, 5 grams Fe(NO)$_3$·9H$_2$O. | Red | Red | Deep red | Stable to storage. |
| XI | do | Red | Red | do | Stable to storage very excellent. |
| XII | do | Red | Red | do | Very excellent. |
| XIII | do | Red | Red | do | Do. |
| XIV | do | Red | Red | do | Do. |
| XV | do | Red | Red | do | Do. |

(1) Nitrilotriacetic acid,
(2) Diethylenetriaminepentaacetic acid,
(3) Hydroxyethylethylenediaminetriacetic acid,
(4) Hydroxyethylnitrilodiacetic acid.

It is understood of course that the chelating acid is useful in any acid form, i.e., all hydrogens available to forms having only one acid hydrogen available for reaction.

Example VIII

The EDTA-urea-NH$_3$ condensation product when mixed in a 5:1 weight ratio with Fe(NO$_3$)$_3$·9H$_2$O is stable to pH values in excess of 11.5. This solution can be boiled at pH 11 without noticeable decomposition. This is an excellent system for stabilizing Fe (III).

Example IX

An excellent composition is obtained when:

| | Grams |
|---|---|
| EDTA | 60 |
| Urea | 8 |
| NH$_4$OH | Excess | are reacted as reported by means of vacuum. The product weighs 75 grams, and is a wet resin which will air-dry to a solid, weighing 67 grams. Two grams of this product will chelate 5 grams of ferric nitrate·9H$_2$O. The chelate is red at pH 7, wine-red at pH 10. A white cloth swatch saturated with this iron chelate, dried in air, can be washed clear with cold water.

The chelate will transfer by capillary wick into a second beaker.

The chelate is soluble in 75 parts methanol, 25 parts water solution. It can be dried down to a solid, and redissolved in methanol/water solution, or water.

The urea-NH$_3$ condensate can form relatively stable Fe (III) complexes and quite stable red Cu (II) complexes. The product, by condensing urea and NH$_3$ at 130° C., indicated by their complexes some form of biuret polymer residue.

NTA molecular weight is 191. Accordingly, 286.5 grams or parts should chelate 404 grams or parts of Fe(NO)$_3$·9H$_2$O. This composition should be stable up to a pH of about 7.

For evaluation, I chose to use 2 grams or parts of NTA to 4 grams or parts of Fe(NO$_3$)$_3$·9H$_2$O to a total solution of 100 cc. Then the pH is raised with dilute alkali such as NaOH, KOH, NH$_4$OH or Na$_2$CO$_3$. I prefer the latter in order to avoid local concentration of free caustic.

Compositions and tests:

| | |
|---|---|
| NTA | gr 2 |
| Fe(NO)$_3$·9H$_2$O | 4 |
| Water to | cc 100 |

Ambient pH 2—
  Na$_2$CO$_3$ to pH 6, clear reddish
  Na$_2$CO$_3$ to pH 7, precipitates, increases after 6 hr. with time Compare following compositions and reaction products:

A. NTA, 38 grams or parts final weight 42 grams, pH 5
  Urea, 2 grams or parts final weight 39 grams
  Excess NH$_4$OH
B. NTA, 38 grams or parts final dry weight 44 gr., pH 5
  Urea, 4 grams or parts
  Excess NH$_4$OH
C. NTA, 38 grams or parts final weight 50 grams, pH 5
  Urea, 8 grams or parts
  NH$_4$OH excess.
D. NTA, 38 grams or parts final weight 52 grams, pH 5
  Urea, 10 grams or parts
  Excess NH$_4$OH
E. NTA, 38 grams or parts final weight 56 grams, pH 5
  Urea, 16 grams or parts
  Excess NH$_4$OH
F. NTA, 38 grams, final weight 51 grams questionable—at least not as good as urea
  Thiourea, 8 grams
  Excess NH$_4$OH
G. NTA and NH$_4$OH only heated, agitated and vacuum to dryness
  NTA, 50 grams, final weight 62 grams, pH 5
  NH$_4$OH excess.

Evaluation of chelation capacity for iron ions at various pH values.

| Composition | Ambient | | |
|---|---|---|---|
| | pH 4 | pH 6 | pH 8+ |
| A....... 2 grams NTA, Fe³ nitrate 4 gr. water to 100 cc. | Clear greenish sol. | Reddish............ | Wine red stable. |
| B................do.............. | ........do................. | ........do............. | Deep red. |
| C................do.............. | Greenish red sol....... | ........do............. | Wine red. |
| D................do.............. | ........do................. | ........do............. | Do. |
| E................do.............. | Reddish............. | Greenish red...... | Do. |

This latter shows that even the lowest member of substituted amide is superior to the simple NTA.

All of the above chelate solutions have been standing at room temperature for over 4 months. They remain clear and will remain clear when diluted to 10 cc. of chelate solution to 100 cc. Color of all clear rose red.

Chelation is the science of metal ion control, i.e., the ability of the chelating agent to inhibit the sequestered metal ion from hydrolysis and/or its reaction with materials or compounds present in solution. The transition metal ion chelates of the carboxy methyl compounds as defined herein are stable and in the acid pH range and not too stable at pH value of 7. Most of these ions and particularly iron are quite substantive to cloth even at pH of 6. It is therefore of interest and also instructive to make swatch tests using white cotton strips. Soak each strip in the concentrated iron chelate solution, dry in air for 3 days and then wash in olive oil soap solution (detergent solution without bleaching agent), a precipitant for normal iron chelates.

Swatches:
(1) NTA chelate at pH 7, dried to brick red color with particles of Fe(OH)₃; washed for 15 minutes in olive oil soap—remains red.
(2) Comp. A chelate at 8+, dried to grayish blue; washed 15 minutes at pH 9+ olive oil soap—white.
(3) Comp. B chelate at 8+, dried gray—less blue; washed at pH 9+, white.
(4) Comp. C chelate at 8+, reddish; washed at pH 9+, white.
(5) Comp. D chelate at 8+, reddish; washed 15 minutes in olive oil soap, dried white.
(6) Comp. E chelate at 8, dried red; washed for 15 minutes in olive oil soap, white.

The test demonstrates that the ferric chelate is stable and the metal ion is inhibited at pH values above presently known limits and is stable in the presence of precipitating agents (soap) under conditions not heretofore possible. The compositions are therefore excellent additives to detergents and/or additions to presently known chelating or sequestering agents to pick up the transition element ions.

What is claimed is:
1. A method of forming a chelating product of urea and ammonia, comprising condensing at a temperature range of from about 100° C.–150° C. urea and ammonia in the molecular ratio of 5:1 to 1:5 and reacting at melting temperature the resulting solid water-soluble urea-ammonia condensate with a chelating compound of the formula:

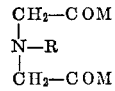

wherein,
R is hydrogen or

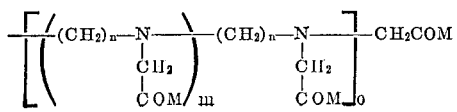

$m = 0\text{--}4,$
$o = 0, 1,$
$n = 2, 3,$ and

—COM is independently selected from the group consisting of —COOH, —COONa, —COOK, —COONH₄, —CH₂OH, C—O—O-alkyl, not more than two COM's being —CH₂OH and the acid salts of these compounds.

2. A method in accordance with claim 1, wherein urea is reacted with aqueous ammonia under conditions of pressure such that reaction temperatures of 100 to 150° C. can be maintained, the product of reaction being separated by evaporation to dryness at the same temperature range.

3. A method in accordance with claim 1, wherein molten urea is reacted with ammonia at a temperature below about 150° C.

4. A condensation product formed by the reaction of urea-ammonia condensate in accordance with claim 1 which is further reacted at melting temperature with a compound selected from the group consisting of those corresponding to the formula

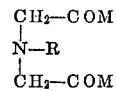

wherein,
R is hydrogen or

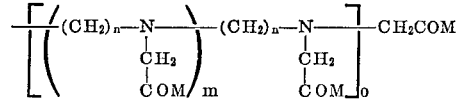

$m = 0\text{--}4,$
$o = 0, 1,$
$n = 2, 3,$ and

—COM is independently selected from the group consisting of —COOH, —COONa, —COOK, —COONH₄, —CH₂OH, C—O—O-alkyl, not more than two COM's being —CH₂OH.

5. A product in accordance with claim 4, wherein the compound is nitrilotriacetic acid.
6. A product in accordance with claim 4, wherein the compound is ethylenediaminetetraacetic acid.
7. A product in accordance with claim 4, wherein the compound is hydroxyethylenediaminetriacetic acid.
8. A product in accordance with claim 4, wherein the compound is diethylenetriaminepentaacetic acid.

References Cited

UNITED STATES PATENTS

| 2,768,895 | 10/1956 | Kamlet | 260—553 |
| 2,882,141 | 4/1959 | O'Donnell | 71—30 |
| 3,245,776 | 4/1966 | Rubin | 71—28 |

FOREIGN PATENTS

| 1,153,358 | 6/1958 | Germany. |
| 687,489 | 5/1964 | Canada. |

DONALL H. SYLVESTER, *Primary Examiner.*

T. G. FERRIS, *Assistant Examiner.*

U.S. Cl. X.R.

71—28, 30; 260—482, 553, 555